Jan. 7, 1930.  J. I. OLSSON ET AL  1,742,722
ARRANGEMENT IN LOCKING NUTS
Filed Feb. 10, 1928

Patented Jan. 7, 1930

1,742,722

UNITED STATES PATENT OFFICE

JOHN IVAR OLSSON, OF BOFORS, AND GUNNAR ULF ADALRIK HULT, OF STOCKHOLM, SWEDEN

ARRANGEMENT IN LOCKING NUTS

Application filed February 10, 1928, Serial No. 253,419, and in Sweden July 14, 1927.

This invention relates to an arrangement in such nuts where the locking is caused by means of an inner nut of elastic material arranged in a depression in that end of the outer nut which is turned towards the seat. As an elastic material it has been found advantageous to use a fibre material; however, aluminum may also be used.

Figure 1:
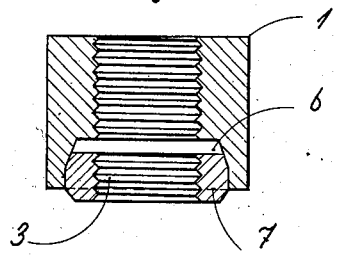
Figure 2:
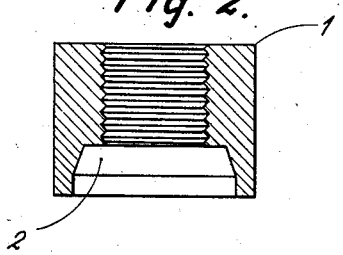
Figure 3:
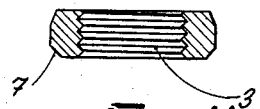
Figure 4:
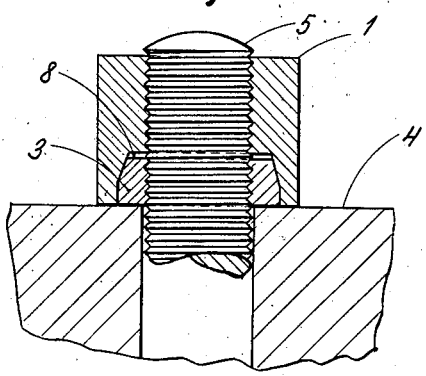

Fig. 1 shows an embodiment of the locking nut with the inner nut, before being applied to a screw or bolt. Fig. 2 shows the outer nut alone, Fig. 3 the inner nut. Fig. 4 shows the locking nut tightened onto a screw. All the figures are in longitudinal section.

1 is the outer nut, 2 is a circular depression having the same axis as the nut 1, the walls of which depression are cylindrical near the face of the nut, and tapering or conical in its deeper portion. 3 is an inner nut made of elastic material, the outer surface of which is partly frusto-conic like the depression 2, and partly cylindrical with such a diameter that, when the inner nut is shoved into the depression 2, it is held there by friction. The inner nut is further made in relation to the depression 2 in such a way as to project a little outside the end surface of the outer nut, when it has been inserted in the depression 2, but is not tightened onto a screw (Fig. 1). Between the inner end of the nut 3 and the bottom of the depression 2 there is at the same time a space, as shown at 6, in Fig. 1. The projecting end of the inner nut 3 is provided with a bevel 7 constituting a second frusto-conic portion. 4 is a seat, against which the locking nut rests, when it is in locked position on the screw 5. 8 is a space between the inner end of the inner nut 3 and the bottom of the depression 2, as it is when the nut is in locked position.

The manner of working of the nut is as follows. The nut 1 with the inner nut 3 is placed on a screw 5 and is screwed against the seat 4. By the friction between the inner nut 3 and the walls of the depression 2 the inner nut is caused to participate in the movement of the outer nut. When the nut 3 has come into contact with the seat, and the turning of the outer nut is continued in the same direction as before, the material in the nut 3 is pressed against the threads of the screw. Since the cross-sections of the inner nut 3 are circular and since it has the same axis as the nut 1, when its friction against the seat 4 and the threads of the screw becomes greater than the friction between the inner nut 3 and the nut 1, the inner nut 3 ceases to rotate and the nut 1 slides over it, forcing it more tightly against the screw and against the conical walls of the recess. The bevel 7 is intended to prevent the material in the nut 3 from being pressed out between the nut 1 and the seat 4. When the locking nut is fully screwed on, the inner nut 3 has substantially the sectional form shown in Fig. 4. In this position there is still a space 8 between the nut 3 and the bottom of the depression 2, which insures the juxtaposition of the outer nut 1 against the seat 4, when it is tightened in final position. Owing to the friction between, on one hand, the depression 2 the seat 4 and the screw 5 and, on the other hand, corresponding surface portions of the nut 3, the outer nut 1 is held securely on the screw 5. The inner nut 3 is completely enclosed in the space limited by the depression 2, the seat 4 and the screw 5, resulting in the additional advantage that the material in the inner nut is protected from damp and other outside influences.

If, when the locking nut is loosened after having been used, the inner nut 3 does not project beyond the outer nut as much as is required in order to have a sufficient locking effect upon a renewed tightening of the nut, one can lay a ring, of for instance metal thread, on the seat 4 round the screw 5. The outer diameter on this ring should be less than the diameter of the depression 2 at the end surface of the outer nut, so that the necessary friction pressure for locking the nut can be obtained by tightening it.

If the inner nut 3 has become spoilt by repeated tightenings, it can easily be taken out and replaced by a new one, after which the locking nut is again able to be used. The outer nut thus need never be destroyed, neither need the screw, if suitable material is used in the nut 3.

That the inner nut 3 is provided with inside threads, matching the threads of the screw 5, is of great importance, because thereby the structure of the material in the inner nut is prevented from being too much altered by the tightening.

Having now described our invention, that we claim as new and desire to secure by Letters Patent is:

1. A locking nut of the character described comprising a threaded outer nut and a similarly threaded inner nut of elastic material, the outer nut being provided with a cylindro-frustoconic recess, the inner nut having frustoconic end portions and a cylindrical intermediate portion adapted to fit within said recess in frictional engagement with the cylindrical walls thereof the altitude of the inner frustoconic portion being less than the altitude of the frustoconic portion of the recess whereby positive axial movement of the inner nut with respect to the outer nut, after the cylindrical portion of the inner nut has filled the cylindrical portion of the recess, will cause the inner nut to be forced inward in order to form a frictionally locking connection between the outer nut and a screw.

2. A locking nut of the character described comprising a threaded outer nut and a similarly threaded inner nut of elastic material, the outer nut being provided with a cylindro-frustoconic recess, the inner nut being cylindro-frustoconic and adapted to fit within said recess in frictional engagement with the cylindrical walls thereof, the altitude of its frustoconic portion being less than the altitude of the frustoconic portion of the recess, whereby positive axial movement of the inner nut with respect to the outer nut, after the cylindrical portion of the inner nut has filled the cylindrical portion of the recess, will cause the inner nut to be forced inward in order to form a frictionally locking connection between the outer nut and a screw.

In witness whereof, we have hereunto signed our names.

JOHN IVAR OLSSON.
GUNNAR ULF ADALRIK HULT.